April 4, 1961 R. L. WEHRLI 2,978,581
RADIANT ENERGY DETECTION DEVICE
Filed Nov. 20, 1956

INVENTOR.
Robert L. Wehrli.
BY
*His Attorney.*

United States Patent Office 2,978,581
Patented Apr. 4, 1961

2,978,581

RADIANT ENERGY DETECTION DEVICE

Robert L. Wehrli, Santa Ana, Calif., assignor to Robertshaw-Fulton Controls Company, Richmond, Va., a corporation of Delaware Filed Nov. 20, 1956, Ser. No. 623,491

7 Claims. (Cl. 250—43.5)

This invention relates to a radiant energy detection device and, more particularly, to a device for detecting the presence of a liquid or a fluidized solid between a fixed radioactive source and a radiation detection means.

Broadly, the present invention comprises a tubular casing having a plurality of holes therein in combination with a radiation detection apparatus. A fixed radioactive source is anchored in the casing adjacent one end thereof by a flanged housing having a plurality of apertures therein, and the casing is sealed at the opposite end by a threaded plug. The interior of the casing houses a radiation detector, an amplifier, and an electrically energized switch in addition to defining an open space or chamber between the radioactive source and the radiation detector.

The chamber in the casing interior is in communication with the plurality of holes in the casing and is thereby capable of receiving a liquid or a liquidized solid therein. The presence of a liquid or a liquidized solid in the chamber between the radioactive source and the detector produces a change in intensity of the radiation received by the detector and moves the switch to one of a plurality of circuit controlling positions to thereby energize an alarm, a pump, an unloading means or any other type of control device.

The present invention is especially well adapted to detect the presence or the level of a liquid in a container although it may be used equally as effectively to detect the presence or the level of a fluidized solid in a bin or the like. Being compact and portable, the subject device can be installed as a unit at any position on the wall of a container or bin to accurately detect the elevation of a liquid or a liquidized solid therein. In addition to being compact and portable, the structural arrangement of the components of the subject invention also provides a device that is insensitive to shock and acceleration and insensitive to variations in temperature, pressure and humidity.

Therefore, the primary object of the present invention is to detect the presence of a liquid or a fluidized solid between a fixed radioactive source and a radiation detector.

Another object of the present invention is to support all of the elements of a liquid or fluidized solid detector in a single casing to form a portable, compact unit.

Another object of the invention is to eliminate the effects of shock and acceleration in a liquid or fluidized solid detection device.

Another object of the invention is to eliminate the effects of variations in temperature, pressure and humidity in a liquid or liquidized solid detection device.

Another object of the invention is to support the radioactive source in a flanged housing having a plurality of apertures in the flange thereof to provide access to a chamber between the radioactive source and the radiation detection means.

Other objects and advantages of the present invention will become apparent from the following description taken in connection with the accompanying drawing wherein.

Figure 1:
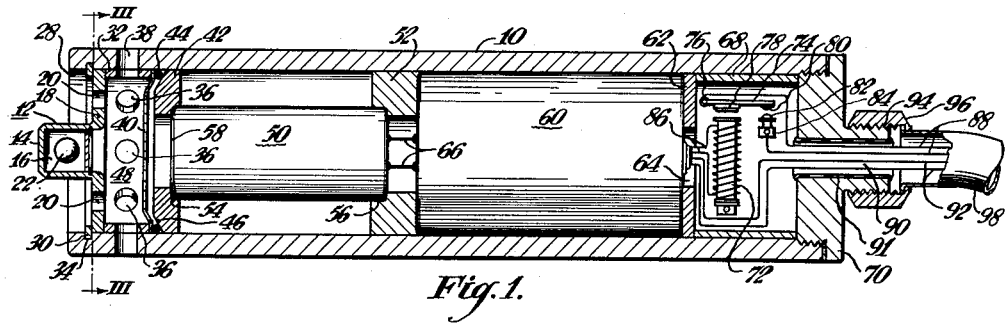
Fig. 1 is a longitudinal sectional view showing the arrangement and relative positions of the various components of the device.
Figure 2:
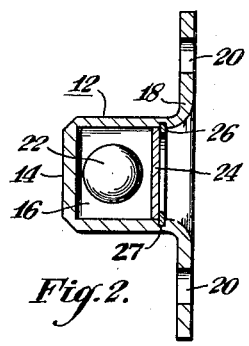
Fig. 2 is an enlarged detail view of a portion of Fig. 1.
Figure 3:
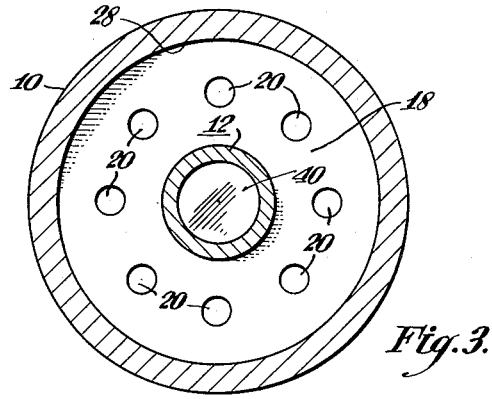
Fig. 3 is an enlarged sectional view taken along the line III—III of Fig. 1.

Referring more particularly to the drawing, Figs. 1 to 3 inclusive, show a preferred embodiment of the invention as comprising an elongated tubular casing 10 made of any suitable material and having a flanged housing, generally designated by the reference numeral 12, mounted therein adjacent one end thereof. The flanged housing 12 may be made of any suitable material, such as plastic, lead, or stainless steel, and includes a central portion 14 defining a cavity 16 therein and an annular flange portion 18 having a plurality of spaced apertures 20 extending therethrough.

Seated within cavity 16 of flanged housing 12 is a radioactive source 22 of any suitable type which, in this preferred embodiment of the invention, consists of a pellet or the like of radioactive strontium capable of emitting beta radiation. While other radioactive elements such as calcium, antimony, nickel or the like could be used as a radioactive source, radioactive strontium is preferred because of its long life and high beta ray emission property. Furthermore, a radioactive source capable of beta ray emission is employed in the preferred embodiment of the subject device in preference to radioactive elements capable of other types of emission because beta rays possess a wide variation in range between liquid and gases and easily penetrate thin sections of light metals. A beta ray radioactive source is also preferred because of the ease with which the beta rays can be safely shielded.

As best shown in Fig. 2, the radioactive source 22 is retained in the cavity 16 by means of a beta ray permeable disc 24 fixedly positioned in the open end of cavity 16 by a resilient snap ring 26 seated in an annular recess 27 formed in the inner periphery of cavity 16. Being retained in cavity 16, the radioactive source 22 is, thus, safely housed and shielded in an enclosure having only one beta ray permeable wall, i.e., the disc 24, the other walls of the cavity 16 being composed of a non-permeable material such as plastic, lead, or stainless steel as hereinbefore mentioned.

Instead of using a radioactive source that is supported in the cavity of a flanged housing, as disclosed in the preferred embodiment of the invention, it will be obvious to those skilled in the art that any suitable type of support means for retaining a radioactive source in a fixed relationship in the end of casing 10 could be substituted for the flanged housing 12 and the radioactive pellet 22 carried thereby. For example, the flanged housing 12 could be replaced by an apertured disc having a radioactive or irradiated center portion or an apertured disc having a strip of radioactive foil cemented thereto. These suggested types of construction are especially advantageous when the radiation from the radioactive source is of a low intensity.

As best shown in Fig. 1, the flanged housing 12 is retained in position in the inner bore 28 of casing 10 by means of a snap ring 30 and an annular spacer element 32, the snap ring 30 being seated in an annular recess 34 formed in the periphery of the casing inner bore 28. Spacer element 32 is provided with a plurality of peripherally spaced holes 36 therein which register with a plurality of peripherally spaced holes 38 extending through casing 10, the holes 36 and 38 corresponding in size and number.

A pan shaped sealing plate 40 is disposed in bore 28 of casing 10 between spacer element 32 and a second annular spacer element 42. A resilient O-ring 44 is positioned between a beveled shoulder 46 on the spacer 42 and the sealing plate 40 to hermetically seal the inner bore 28 of the casing 10. The sealing plate 40 may be made of any suitable beta ray permeable material although aluminum is preferred.

It will also be noted that sealing plate 40 defines a chamber 48 in casing bore 28 extending between sealing plate 40 and the flanged housing 12. The chamber 48 thus defined communicates with the exterior of casing 10 by means of holes 36, 38, and 20 and is thereby accessible to the ingress and egress of a gas, a liquid, or a fluidized solid.

Adjacent the sealing plate 40, the casing 10 houses a detector or beta ray sensitive electrical device 50 that is capable of producing an electrical signal when exposed to beta radiation. Geiger-Mueller tubes, ionization chambers, scintillation sensitive devices or any other conventional type of beta ray detection apparatus can be utilized as a detector. The detector 50 is retained in position in casing bore 28 by spacer 42 and a third annular spacer 52, the detector being seated on shoulders 54 and 56 formed on the spacers 42 and 52 respectively. It will also be noted that the detector 50 is provided with a beta ray permeable window 58 in the left end thereof as seen in Fig. 1.

The casing 10 also houses an amplifier or electronic amplifying system 60. The amplifier is separated from the other components within the casing 10 by annular spacer 52 and a cylindrical retaining plate 62 having a centrally disposed aperture 64 therein. A pair of leads 66 conduct the output voltage of the detector 50 to the amplifier 60.

As seen in Fig. 1, a thin-shelled annular spacer 68 is mounted in the casing bore 28 between retaining plate 62 and a threaded plug 70 carried in the right end of casing 10. The spacer 68 has mounted therein a switching mechanism comprising an electro-magnetic solenoid 72 and a rotatable armature 74 pivotally attached to spacer 68 by a pin 76. Armature 74 carries a plate 78 aligned with solenoid 72 and a switch contact 80 which is adapted to engage a second switch contact 82 supported on a block 84 mounted on spacer 68.

The output of the amplifier is fed into the solenoid 72 by a pair of leads 86. When energized, the solenoid attracts the armature 74 and closes a circuit at contacts 80 and 82 causing a current to flow in a pair of terminal leads 88 extending through a passage 90 in threaded plug 70 and electrically connecting the two contacts 80 and 82. Passage 90 carries a grommet or the like 91 to insulate the walls of the passage and to prevent damage to the leads extending therethrough. The terminal leads 88 may be connected in series with an external source of current (not shown) including an alarm, a pump, an unloading means or any other type of control apparatus with which the present invention may be advantageously used.

A pair of terminal leads 92 also extending through passage 90 in plug 70 conducts current from an external power supply (not shown) to feed the amplifier circuit. Plug 70 is threaded at 94 to accommodate thereon a threaded nut 96 which connects the plug 70 with one end of a flanged conduit 98. Connected to plug 70, the flanged conduit 98 seals the interior of the casing 10 in addition to providing a protective shield or housing for the pairs of terminal leads 88 and 92 when the detection device is installed in a position of intended use, as shown in Figs. 4 and 5.

*Operation*

Figure 4:
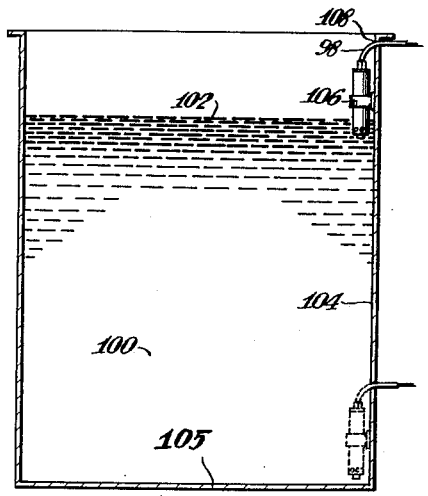
Fig. 4 is a schematic illustration of one application of the invention.
Figure 5:
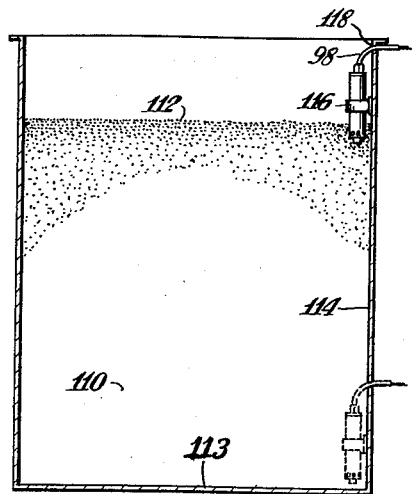
Fig. 5 is a schematic illustration of another application of the invention.

Fig. 4 shows one environmental application of the present invention wherein the detection device is fixed to the inner wall 104 of a tank 100 containing a liquid 102. The detection device is mounted at the desired elevation on the wall 104 of the tank 100 by any suitable means, such as a hanger 106, and the flanged conduit 98 attached to the detection device extends through a hole 108 in tank wall 104. If the level of the liquid 102 in the tank 100 is below the detection device, chamber 48 between the radioactive source 22 and the detector 50 will be filled with air or the atmosphere within tank 100. With the chamber 48 filled with air, the range of the beta rays is sufficient to traverse the distance between the source 22 and the detector 50. The beta rays thus transmitted incite sufficient ionization of the gas in the detector 50 to generate a signal which is presented to the amplifier 60 for amplification. The amplified signal then energizes solenoid 72 which attracts armature 74 and thereby completes a circuit in terminal leads 88.

However, should the level of the liquid 102 in tank 100 rise upwardly to the point where chamber 48 becomes filled with a liquid, the beta rays radiating from the source 22 become almost completely absorbed by the liquid in chamber 48 and any stray radiation which may reach the detector 50 is ineffective in inciting ionization therein. The detector 50 will thereby fail to present a signal to the amplifier 60 for amplification and the solenoid 72 will consequently become de-energized. With the solenoid 72 de-energized, switch contacts 80 and 82 become separated and the circuit in terminal leads 88 becomes broken.

Should the chamber 48 thereafter become partially or totally depleted of its liquid content due to the lowering of the level of the liquid 102 in tank 100, some or all of the beta rays will again reach the detector 50. The signal generated will again be fed into the amplifier 60, amplified, and then transmitted to the electro-magnetic solenoid 72 which will close contacts 80 and 82 and complete the circuit in terminal leads 88.

The subject detection device is also shown in dotted lines in Fig. 4 as being mounted on tank wall 104 adjacent the bottom 105 of tank 100. When mounted in this position, the detection device can be advantageously used to detect or signal the emptiness of tank 100 or a predetermined low liquid level therein. Moreover, the subject detection device could also be mounted by any suitable means within a discharge conduit (not shown) connected to tank wall 104 or tank bottom 105 to detect or signal the emptiness of tank 100.

Fig. 5 shows another environmental application of the present invention wherein the detector is mounted on the inner wall 114 of a bin 110 containing a liquidized solid 112 such as grain or any other type of fluent material. The detection device may be mounted on the wall 114 of the bin 110 by any suitable means, such as a hanger 116, and at any desirable position or elevation above bin bottom 113 (one mounting position of the detection device being shown in dotted lines), and the flanged conduit 98 attached to the detection device extends through a hole 118 in the bin wall 114. When used to detect the level or the presence of a liquidized solid, the subject detection device functions in precisely the same manner as when used to detect the level or the presence of a liquid.

A radiant energy detection device constructed in accordance with the present invention not only is compact and portable but is also insensitive to shock and acceleration. Due to the use of a fixed radioactive source positioned a predetermined distance from a fixed detector, the detection device is sensitive only to the molecular density between the radioactive source and the detector. This structural combination of a fixed source of radioactivity and a fixed detector intervened by a chamber accessible to the presence or absence of a liquid or liquidized solid will also quite obviously render the radiant energy detection device insensitive to variations in temperature, pressure, and humidity.

While the preferred embodiment of the subject device contemplates a detector wherein a radioactive source, a detector, an amplifier, and a switching mechanism are all carried in or supported by a single casing, it will be readily appreciated that the arrangement of the four components within a single casing is illustrative only and is not to be interpreted in a limiting sense. Quite obviously, the amplifier and switching mechanism could be supported in another casing or by any suitable means and positioned remotely from the radioactive source and the detector.

Furthermore, while only one embodiment of the invention has been shown and described herein, it will be apparent to those skilled in the art that the construction and arrangement of parts in the present invention may be variously embodied or changed without departing from the scope of the invention as defined in the appended claims.

It is claimed and desired to secure by Letters Patent:

1. In combination, a portable casing, a fixed radioactive source anchored in said casing adjacent one end thereof and shielded to emit rays substantially interior of said casing, radiation detection means positioned in said casing for producing an electrical signal when exposed to radiation from said radioactive source, a chamber having a plurality of passages in said casing adapted to receive a fluid and positioned between said radioactive source and said detection means, the presence of a fluid in said chamber being operable to reduce in intensity the radiation received by said detection means, hermetic sealing means positioned in said casing between said radioactive source and said detection means and forming one wall of said chamber, means in said casing to amplify the electrical signal produced by said detection means, switch means in said casing electrically energized by said last named means and movable between a plurality of controlling positions in response to the change in intensity of the radiation received by said detection means, and closure means sealing an opposite end of said casing whereby said detection means, said amplifying means and said switch means are sealed from the fluid.

2. A device for detecting the liquid level of a body of liquid comprising, in combination, a portable casing, a fixed radioactive source anchored in said casing adjacent one end thereof and shielded to emit rays substantially interior of said casing, detection means in said casing for producing an electrical signal when exposed to radiation from said radioactive source, a chamber having a plurality of passages in said casing between said radioactive source and said detection means, spaced apertures extending through said casing into said chamber whereby the same is accessible to the flow of liquid therethrough during a change in the liquid level of said body of liquid, means in said casing to amplify the electrical signal produced by said detection means, switch means in said casing electrically energized by said last named means and movable between a plurality of controlling positions in response to a change in intensity of the radiation received by said detection means, said change in intensity of said received radiation being a function of the liquid level of said body of liquid, and sealing means disposed in said casing adjacent said detection means to seal the same from said chamber.

3. A device insensitive to shock and acceleration for detecting the presence of a liquid comprising, in combination, a portable casing having a plurality of holes extending therethrough, a flanged housing anchored in said casing adjacent one end thereof, a radioactive source fixed in said flanged housing, said source shielded to emit rays substantially interior of said casing, detection means disposed in said casing for producing an electrical signal when exposed to radiation from said radioactive source, a chamber in said casing between said radioactive source and said detection means communicating with said holes in said casing to receive a liquid in said chamber, means to amplify the electrical signal produced by said detection means, and switch means in said casing movable between a plurality of controlling positions in response to changes in intensity of the radiation received by said detection means, said change in intensity of said received radiation effected by the presence of a liquid in said chamber.

4. A device insensitive to shock and acceleration for detecting the presence of a fluidized solid comprising, in combination, a portable casing provided with a plurality of holes extending therethrough, a housing having a centrally disposed cavity and a peripheral flange, said flange being secured to said casing adjacent one end thereof and being provided with a plurality of spaced apertures, a radioactive source fixed within the cavity of said housing and shielded to emit rays substantially interior of said casing, detection means disposed in said casing for producing an electrical signal when exposed to radiation from said radioactive source, a chamber in said casing between said radioactive source and said detection means communicating with the apertures in said flange and the holes in said casing to receive a fluidized solid in said chamber, means to amplify the electrical signal produced by said detection means, and switch means movable between a plurality of controlling positions in response to a change in intensity of the radiation received by said detection means, said change in intensity of said received radiation effected by the presence of a fluidized solid in said chamber.

5. In a device for detecting the presence of a material, the combination comprising a portable hollow casing, a flanged housing fitting into one end of said casing, a radioactive source fixed within said housing and shielded to emit rays substantially interior of said casing, chamber means in said casing disposed adjacent said housing, communication means in said casing for said chamber permitting the ingress and egress of the material to be detected, detection means sealed within said casing adjacent said chamber and being responsive to radiation from said radioactive source for producing an electrical signal, amplification means connected to said detection means to amplify the electrical signal produced thereby, switch means operatively connected to said amplification means for operation thereby, and means for closing an opposite end of said casing and including external connecting means.

6. In a device for detecting the presence of a material, the combination comprising a portable hollow casing, closure means for one end of said casing, a radioactive source supported adjacent an opposite end of said casing and shielded to emit rays substantially interior of said casing, radioactive detection means mounted in said casing in axial alignment with said radioactive source and being responsive to radiation therefrom for producing an electrical signal, a radiation permeable sealing member mounted in said casing adjacent said detection means and being spaced from said radioactive source to define a chamber therebetween, openings in said casing leading into the chamber to permit the ingress and egress of the material to be detected, amplification means connected to said detection means to amplify the electrical signal produced thereby, and switching means operatively connected to said amplification means for operation thereby.

7. In a device for detecting the presence of a fluidized material, the combination comprising a hollow cylindrical casing, closure means for one end of said casing, a housing secured within and adjacent to the opposite end of said casing and having a centrally disposed shielded cup-shaped cavity and a peripheral flange, the opening of said cup-shaped cavity communicating with the interior of said casing and covered by a radioactive permeable member, said flange being provided with a plurality of spaced apertures communicating the exterior of said cylindrical casing with the interior thereof, a radioactive source affixed within the cup-shaped cavity, said cup-shaped cavity directing substantially all of the emitted radioactive rays axially of said cylindrical casing, detection means disposed within said casing and spaced from said housing for producing an electrical signal when exposed to radiation from said radioactive source, said detection means having a radioactive permeable member positioned substantially opposite said open end of said cup-shaped cavity to receive said radioactive rays, a chamber defined by said oppositely disposed housing and detection means and said casing, spaced apertures in the periphery of said casing of said chamber, means to amplify the electrical signal produced by said detection means, and switch means movable between a plurality of controlling positions in response to a change in the intensity of the radiation received by said detection means, said change in intensity of said received radiation effected by the presence of a fluidized material in said chamber.

References Cited in the file of this patent

UNITED STATES PATENTS

| | | | |
|---|---|---|---|
| 1,746,616 | Sounitza | Feb. 11, | 1930 |
| 2,487,797 | Friedman | Nov. 15, | 1949 |
| 2,565,963 | Graham | Aug. 28, | 1951 |
| 2,599,975 | Carpenter | June 10, | 1952 |
| 2,676,265 | Green | Apr. 20, | 1954 |
| 2,688,872 | Hartline | Sept. 14, | 1954 |
| 2,713,124 | Graham | July 12, | 1955 |
| 2,714,165 | Herzog | July 26, | 1955 |
| 2,722,609 | Morgan | Nov. 1, | 1955 |
| 2,734,136 | Atchison | Feb. 7, | 1956 |
| 2,735,944 | Greer | Feb. 21, | 1956 |
| 2,737,592 | Ohmart | Mar. 6, | 1956 |
| 2,830,183 | Wolfe | Apr. 8, | 1958 |
| 2,873,377 | McKay | Feb. 10, | 1959 |